Patented Feb. 12, 1935

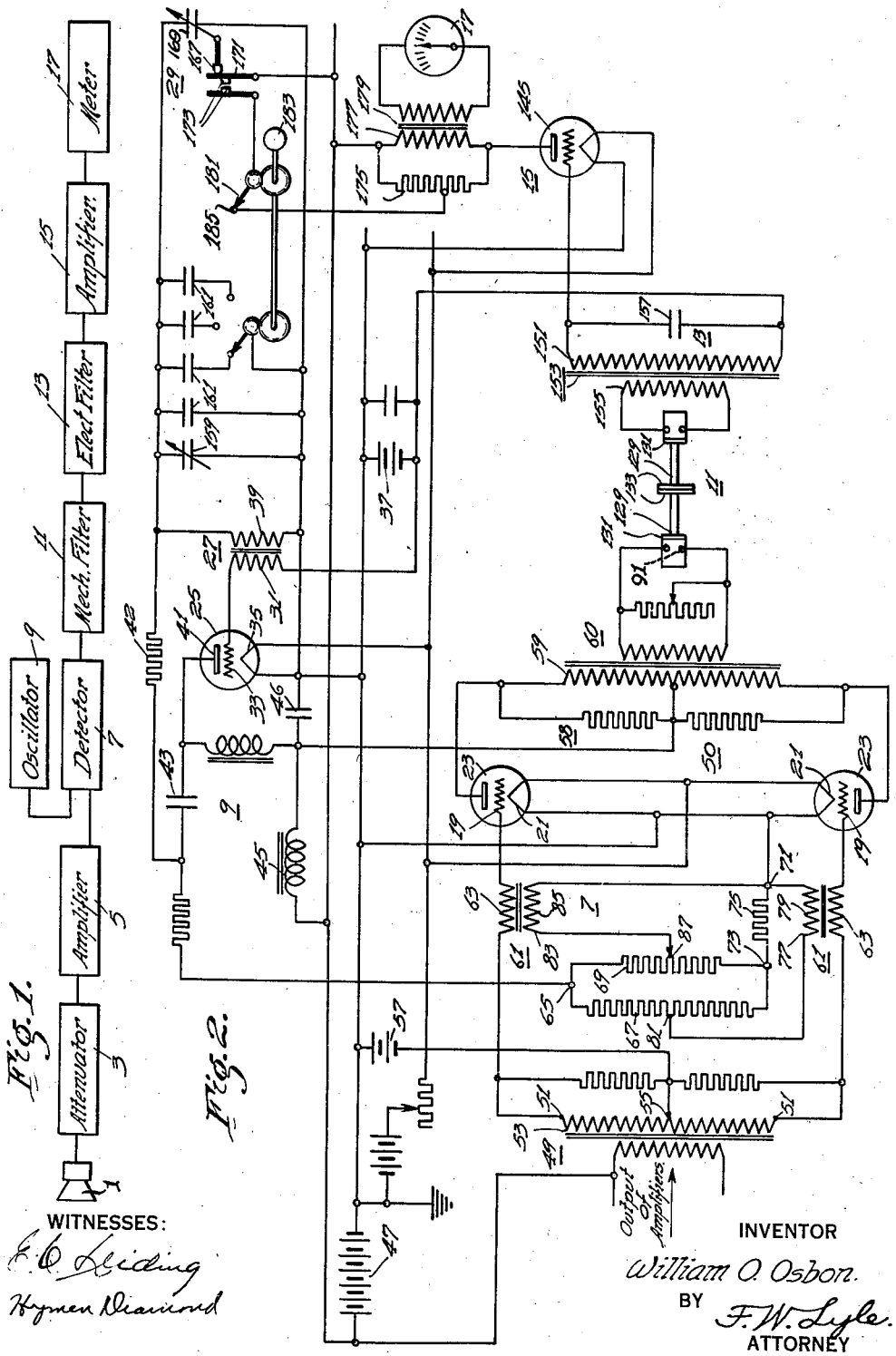

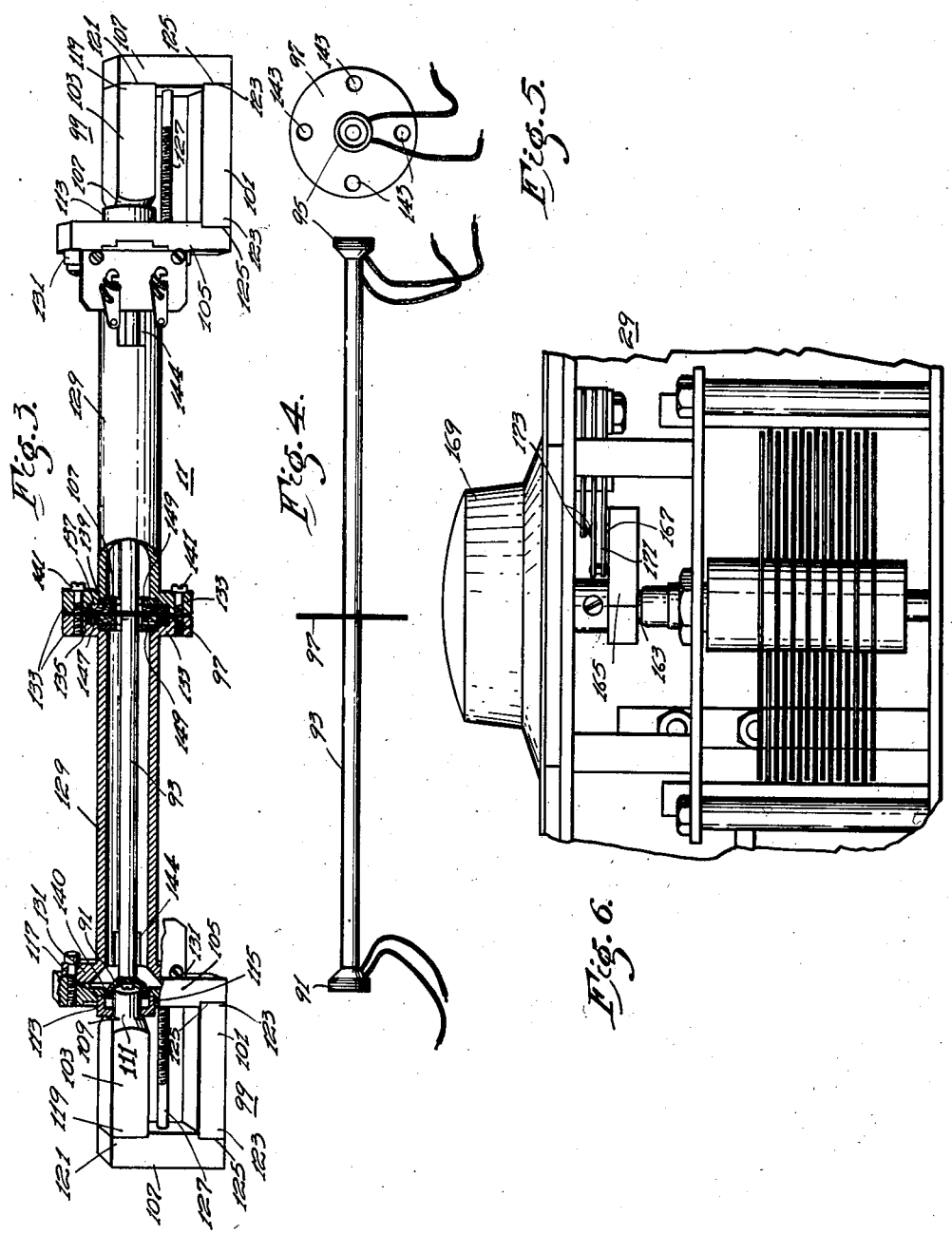

1,991,060

UNITED STATES PATENT OFFICE 1,991,060

VIBRATION ANALYZER

William O. Osbon, Wilkinsburg, Pa., assignor to Westinghouse Electric & Manufacturing Company, East Pittsburgh, Pa., a corporation of Pennsylvania Application November 29, 1932, Serial No. 644,815

16 Claims. (Cl. 181—0.5)

My invention relates to vibration or sound analyzers and has particular relation to analyzers of the type incorporating mechanical filters.

A vibration analyzer of the type to which my invention particularly relates, in general, comprises a pick-up, whereby the disturbance to be analyzed is converted into electromagnetic energy, an amplifying and detecting system, whereby the electromagnetic energy thus attained is properly prepared for analysis, a mechanical filter, whereby the frequency components of the energy so prepared are segregated and a device for indicating the magnitudes of the components so segregated. In apparatus provided in accordance with the teachings of the prior art, of which I am aware, the mechanical filter comprises a rod rigidly supported at its center on which a periodic disturbance corresponding to the electromagnetic energy to be analyzed is impressed. The rod thus energized vibrates longitudinally, and as it is supported at the center, the point of support determines a node of the longitudinal waves set up along the rod. The fundamental frequency at which a rod of given material thus supported vibrates is dependent on the length of the rod, and the length of the corresponding wave set up along the rod is equivalent to twice the length of the rod.

The rod vibrates as a resonant system with an actual node at the point of support only if it is accurately supported at what may be termed its natural nodal point. Any rod which may be selected to be utilized for the present purpose will have a certain distribution of mass and certain structural peculiarities. When the longitudinal waves are set up along the rod it will tend to vibrate in a manner predetermined by the structure of the rod and in spite of the rigid support the position of the nodal point will depend on the structure. If the point of support does not correspond to the exact point at which the rod would have a node, the point at which the rod is supported has impressed thereon a force of predetermined magnitude, depending on the displacement of the support from the natural nodal point. Since the support is rigid, the tendency of the rod to vibrate at the point of support and the resistance of the support to the vibration results in the absorption of considerable energy at the point of support and in a consequent diminution of the efficiency of the mechanical filter.

It is accordingly an object of my invention to provide a mechanical filter for a vibration-analyzing system that shall be inexpensive to construct and that shall operate with high efficiency.

Another object of my invention is to provide a vibration-analyzing system of the type incorporating a mechanical filter that shall be of such structure that the necessity of accurately determining the point of support of the rod incorporated in the filter shall be avoided.

A further object of my invention is to provide a mechanical filter for a vibration-analyzing system in which the energy losses arising from the slight displacement of the actual support of the vibrating rod from the natural nodal point thereof shall each occasion a minimum loss of energy.

Still another object of my invention is to provide a support for the rod incorporated in the mechanical filter of a noise analyzer such that the losses occasioned by the displacement of the support from the natural nodal point of the rod shall be suppressed.

More concisely stated, it is an object of my invention to provide a mechanical filter for a vibration-analyzing system of the type incorporating a rod to be vibrated at a resonant frequency in which, without taking any special pains to accurately center the support for the rod, the rod shall be so supported as to operate at a high efficiency.

According to my invention I provide a mechanical filter for a vibration-analyzing system which incorporates a rod that is resiliently supported. A disturbance, from which a predetermined frequency is to be segregated by the rod, is impressed on one end thereof, and the rod vibrates longitudinally at a frequency corresponding to its length and material and to its point of support.

In the preferred practice of my invention the rod is supported substantially at the center and consequently the fundamental resonant frequency thereof is one having a wave length equal to twice the length of the rod. There are of course other modes of vibration of the rod for the same supporting point. These modes have frequencies that correspond to certain multiples of the fundamental frequency. The frequencies of these modes of vibration are so remote from the frequency of the fundamental mode that they do not give rise to any problem and may be eliminated with facility by an ordinary electrical filter.

The nodal point of the vibration is substantially at the point of support, and since the rod is supported at its central point, the nodal point is also near the central point. However, by reason of the mechanical difficulties involved, it is, in general, impossible to so construct the rod and the support that the natural nodal point exactly corresponds to the point of support. Since, therefore, the nodal point is slightly displaced from the point of support, the rod will have a tendency to move at the point of support, and if the rod were rigidly supported, the tendency to vibrate would result in the absorption of considerable energy. However, when the rod is resiliently supported at a point near the natural nodal point, the support merely yields to the rod, and, without in any way reducing its effectiveness as a filter, permits the rod to vibrate in the region in which it engages the rod and to find its natural nodal point. Since the support offers little resistance to the tendency of the rod to move in the region thereof, the energy absorbed by the motion of the rod is small and the mechanical filter operates with high efficiency.

It is to be noted that my invention is particularly applicable to a system in which the rod vibrates longitudinally. However, it is apparent that my invention may be applied to a system in which the longitudinal vibration is only one component of a complex vibratory movement. In using the phrase "longitudinal vibration" or its equivalent in describing and claiming my inventon, I wish to be understood as in no way intending to limit myself to a system in which the vibration is purely longitudinal. Where the phrase is used, it is intended to apply only to the longitudinal component of vibration.

The novel features that I consider characteristic of my invention are set forth with particularity in the appended claims. The invention itself, however, both as to its organization and its method of operation, together with additional objects and advantages thereof, will best be understood from the following description of a specific embodiment when read in connection with the accompanying drawings, in which:

Figure 1 is a diagrammatic view showing the essential elements of an embodiment of my invention;

Fig. 2 is a diagrammatic view showing a circuit utilized in the preferred practice of my invention;

Fig. 3 is a view, partly in section and partly in front elevation, showing a rod constructed and supported in accordance with my invention;

Fig. 4 is a view in front elevation showing a rod and its appurtenant inductors constructed in accordance with my invention;

Fig. 5 is a view in end elevation of the rod shown in Fig. 4; and

Fig. 6 is a view in side elevation showing a variable capacitor of the type utilized in the practice of my invention.

The apparatus shown in the drawings comprises a vibration or sound pick-up 1, such as a microphone, for example, whereby the vibrations are converted into electro-magnetic energy, an attenuator 3 through which the electro-magnetic energy thus attained is transmitted, and an amplifier 5 whereby the energy is amplified. The output of the amplifier 5 is fed into a detector system 7 where it has impressed thereon an electro-magnetic disturbance of a frequency corresponding to the frequency, the magnitude of which is to be determined. The latter electro-magnetic disturbance is delivered by an oscillator 9 that is capable of being so adjusted as to deliver energy of different frequencies, and the frequencies of the oscillator 9 is at any particular time adjusted to correspond, in a manner to be described hereinafter, to the frequency under observation.

After being rectified by the detector 7, the electro-magnetic energy is impressed on the mechanical filter 11. The component to be analyzed is transmitted through the mechanical filter 11, through an electrical filter 13, that further eliminates undesirable elements in the disturbance, and through another amplifier 15 to a meter 17.

The frequency of the oscillator 9 which is superposed on the external disturbance is adjusted to a value dependent on the frequency of the mechanical filter 11 and also on the frequency of the component of the input energy which is at any instant under observation. Thus, if it is desirable to determine the magnitude of a component of the input disturbance having a frequency of $n$ cycles per second, and the mechanical filter 11 has a resonant frequency of $m$ cycles per second, the energy impressed by the oscillator 9 on the detector should have a frequency of $m+n$ cycles per second. When this frequency is mixed with the component of the input energy that has a frequency $n$, one of the components resulting from the action of the detector 7 has a frequency $m$. Since the mechanical filter 11 operates with considerable selectivity, substantially only the new component of frequency $m$ will be transmitted and the magnitude of the output of the filter 11 will be proportional to the magnitude of the component of the input disturbance that has a frequency $n$, if the detector circuit is properly designed.

The electrical filter 13 into which the output of the mechanical filter 11 feeds is provided for the purpose of eliminating the vitiating influences of disturbances of frequencies different from the resonant frequency of the filter 11 which are originally of such magnitude as to be transmitted at least to a small extent through the filter in spite of its sharpness. Moreover the mechanical filter and its support is in the preferred practice of my invention of such structure that it tends to resonate at another frequency besides the one discussed hereinbefore. This frequency is partly removed by damping and in addition, is so remote from the frequency desired for analysis that it is further suppressed by the electrical filter 13. After being further amplified the output of the filter 11 is transmitted to the meter 17 which indicates the magnitude of the component of the frequency under observation in the input energy. By varying the output frequency of the oscillator, the relative proportion of all the components in the input disturbance may be determined in a similar manner and thus a complete spectrum of the input disturbance may be attained.

In Fig. 2 a preferred circuit utilized in the practice of my invention is shown. To avoid unnecessary prolixity the attenuator 3 and the amplifier 5 which do not concern the present invention are not included in the view.

The input disturbance after being properly modified and amplified is inductively impressed between the grids 19 and the cathodes 21 of the tubes 23 of the balanced detector system 7. Simultaneously, the output of the thermionic oscillator 9, comprising a thermionic tube 25 connected to a transformer 27 to oscillate, and a variable capacitor 29 for regulating the frequency of the output of the oscillations, is impressed on the input circuits of the detector 7 in such manner as to be super-imposed on the external disturbance impressed. As has been explained hereinabove, the output frequency of the oscillator 9 that is impressed on the detector system 7 corresponds to the frequency of the component of the input energy that is under observation in a predetermined manner.

The specific structure of the oscillator does not concern the present invention. However, briefly it may be said that the secondary 31 of the transformer 27 is connected between the grid 33 and the cathode 35 of the tube 25 through a suitable biasing battery 37, while the primary 39 of the transformer 27 is connected to the anode 41 of the tube 25 through a resistor 42 and suitable blocking condenser 43, and directly to the cathode 35. A suitable choke coil 45 and a capacitor 46 prevent the oscillator currents from flowing through the plate potential supply 47. The variable capacitor 29 whereby the frequency of the output of the oscillator 9 is regulated is connected across the secondary 39 of the transformer 27 in the usual manner.

The disturbance to be analyzed is impressed on the grid circuits of the detector tubes 23 through a suitable transformer 49, the terminal taps 51 of the secondary 53 of which are connected to the grids of the tubes 23 while the central tap 55 is connected to the cathodes 21 of the tubes through a biasing battery 57. The potentials impressed between the grids 19 and the cathodes 21 are, therefore, of such polarity that the currents transmitted through the plate circuits 58 of the detector tubes 23 result in potential drops of the same polarity. The total potential applied across the primary 59 of the output transformer 60 of the detector 7 corresponds to the sum of the potentials applied through the secondary 53 of the transformer 49 to the grid circuits of the detector tubes 23.

On the other hand, the output of the oscillator 9 is impressed on the grid circuits of the detector tubes 23 through a plurality of transformers 61, the secondaries 63 of which are connected to the grids 19 and to the terminals 51 of the secondary 53 of the transformer 49 whereby the disturbance to be analyzed is impressed. One output terminal 65 of the oscillator 9 is connected directly to one junction point of a resistor 67 and a potentiometer 69 connected across it, while the other output terminal 71 is connected to the other junction point 73 through a suitable resistor 75. One terminal 77 of the primary 79 of one transformer 61, whereby the impulses generated by the oscillator are impressed on the control circuits of the detector tubes 23, is connected to an intermediate tap 81 of the resistor 67 while the corresponding terminal 83 of the other primary 85 is connected to the movable tap 87 of the potentiometer 69. The potentiometer 69 is provided for the purpose of compensating for differences in the individual characteristics of the detector tubes 23 and their associated circuits and is so adjusted that the potential impulses from the oscillator 9 given to each of the grid circuits of the tubes are substantially equal.

The impulses thus applied to the control circuits of the detectors 23 are of such polarity that the plate currents corresponding to these impulses are of opposite polarity and tend to suppress each other. It is thus seen that the disturbance of the frequency impressed by the oscillator 9 will tend to be suppressed, while the disturbances of frequencies corresponding to the components of the external energy will tend to be transmitted.

This feature of the operation of the system arises by reason of the manner in which the external potential and the potential from the oscillator are impressed. The former potential is impressed across the secondary 53 of the transformer 49, the mid-tap 55 of which is connected to the cathode 21 of the detectors 23. The grid 19 of one detector 23 is, therefore, of a polarity relative to its cathode 21 which is opposite to the polarity of the grid of the other detector relative to its cathode and the corresponding impulses in the plate circuit are transmitted alternately and add up.

The latter potential is impressed simultaneously on the secondaries 63 of the two transformers 61 and the corresponding impulses are transmitted through the detectors 23 simultaneously. Since the impulses thus transmitted through the detectors 23 and through the secondary 59 of the transformer 60 are of opposite polarity, they suppress each other.

The output of the detector 7 is inductively coupled to the input coil 91 of the mechanical filter 11. The filter is shown in detail in Figs. 3, 4 and 5 and comprises a rod 93, to the ends of which a plurality of coils 91 and 95 are secured, and in the center of which a resilient disc 97 is rigidly supported.

The energizing and supporting apparatus for the rod 93 comprises a plurality of magnetic field structures 99, each composed of a magnetized cobalt bar 101 and a plurality of soft steel bars 103, 105 and 107 so arranged relative to each other as to form an approximate rectangle. The upper bar 103 of each structure 99 is provided at one end with a shoulder 109 from which a cylindrical stub 111 projects. A cylindrical sleeve 113 provided with a rim 115 is mounted on each stub 111, and the rim engages a recess 117 in the adjacent end bar 105 of the magnetic structure 99. The remaining end of the upper bar 103 is provided with a projection 119 that engages a corresponding recess 121 in the remaining end bar 107. The lower bar 101 of each structure 99 is provided at its ends with projections 123 that engage corresponding recesses 125 in the end bars 105 and 107 and the end bars 101 and 103 are compressed against the side bars 105 and 107 in the region of their engagement by a bolt 127 which projects through one end bar 107 and is threaded into the end bar 105.

In each magnetic structure 99 the end bar 105 in the recess 117 of which the sleeve 113 is engaged projects above the adjacent upper bar 103, and to each of the bars 105 a tube 129 of length equal to substantially half the length of the rod 93 to be vibrated is mounted. Each of the tubes 129 is equipped with flanges 131 and 133 and the flange 131 adjacent to the end bar 105 is utilized for the purpose of securing the tube to the bar. The remaining flanges 133 on the other hand are disposed adjacent to each other and are equipped with a plurality of recesses 135, 137 and 139 in which the rod 93 that is to be vibrated and the elements appurtenant thereto are mounted.

Each of the end bars 105 on which the flanged hollow cylinders 129 are mounted has further drilled therein a cylindrical opening 140 into which the stub 111 of the adjacent bar 103 projects, and the space between the stub 111 and the walls of the cylindrical opening 140 comprises an air gap in the magnetic circuit of the structure 99.

The rod 93 to be vibrated is so mounted that the inductors 91 and 95 supported on the ends thereof project into the air gap. It is supported from the flanged cylinders 129 that are mounted on the end bars 105 in the structure 99. The disc 97 secured to the rod 93 projects into coinciding recesses 135 provided in the flanges 133 of the cylinders 129, and is secured to the flanges by a plurality of bolts 141 which project through holes 143 in the disc. The disc 97 is so positioned on its support that the coils 91 and 95 that project into the air gaps in the magnetic structures 99 float in the air gaps out of contact with the walls thereof. Each of the flanged hollow cylinders 129 is equipped with slotted openings 144 whereby the rod 93 may be properly positioned before the screws 141 securing it to the flanges 133 are tightened.

The output of the detector 7 is impressed on one of the coils 91 that projects into the air gap of a magnetic field structure 99, and by reason of the coaction of the magnetic field in the air gap and the electro-magnetic field generated by the current in coil 91 a longitudinal periodic disturbance is impressed on the rod 93. If the disturbance impressed has a component frequency equal to the resonant frequency of the rod 93, the rod vibrates longitudinally, and the wave thus generated has a nodal point substantially at the point of support. As the rod vibrates, the coil 95 supported on the remaining end thereof vibrates in the air gap of the corresponding magnetic field structure and currents corresponding to the vibrations of the rod 93 are induced therein. These currents are fed through the filter 13 into the input circuit of an amplifier tube 145, as has been explained hereinabove.

It is to be noted, however, that the rod 93 and its resilient support 97 comprise essentially a mechanical periodic system, of which the rod 93 is the mass and the resilient support is the spring. With actuating currents of certain predetermined frequencies applied to coil 91, this mechanical system will tend to vibrate with a period of its own, and the effect of the vibrations on the output coil 95 will tend to produce a vitiating current in the coil. To suppress this vitiating effect, the resilient coupling is damped. A plurality of washers 147 of rubber or other suitable material project into the coinciding cylindrical recesses 137 of the flanges 133 of the hollow cylinders 129, and are held securely between the cylinders 129 and the resilient disc 97 by a plurality of metallic washers 149 that engage the walls of the remaining coinciding recesses 139 in the hollow cylinders 139 and the washers 147. Since the support is near the natural nodal point of the vibration where the amplitude of the vibration of the rod 93 is small, the effect of the damping washers 147 on the desired mode of vibration is negligible.

To further eliminate vitiating frequency components, the output of the mechanical filter 11 is fed through the electrical filter 13. The electrical filter 13 comprises essentially the secondary 151 of a transformer 153, the primary 155 of which is connected across the output coil 95 of the mechanical filter 11, and a capacitor 157 connected across the terminals of the secondary 151. The characteristic of the filter is such that any components of the natural frequency of the periodic system comprising the rod 93 and the resilient coupling 97, which might have been transmitted through the output coil 95 of the mechanical filter 11 in spite of the precautions which were taken, is entirely suppressed. The output of the filter 13 is coupled to the grid circuit of the amplifier tube 145, the plate circuit of which is in turn coupled to the meter 17 that indicates the magnitude of the energy transmitted.

As has been explained hereinabove to determine the magnitude of a component of frequency $n$ in the input disturbance, the frequency of the oscillator 9 is adjusted by means of condenser 29 to a value $m+n$. When a frequency $m+n$ is impressed by the oscillator on the detector system 7 and one of the components of the input disturbance has a frequency $n$, the principal components in the plate circuits of the detector tubes arising from the detector action will have the following frequencies: $m$, $n$, $m+n$, $m+2n$ and a number of additional components depending on the frequencies of the other components of the input energy.

The component of frequency $m$ will be transmitted by the mechanical and electrical filters 11 and 13 utilized in the system. The component or frequency $m+n$ which would otherwise have the greatest magnitude is substantially suppressed in the detector system 7, while the components or frequencies $m+2n$ and the components corresponding to the other frequencies of the disturbance will be suppressed by the mechanical filter 11, and whatever is left of them will be taken out by the electrical filter 13. Consequently, essentially the only frequency that will be amplified by the amplifier 145 and transmitted to the meter 17 will be the component of frequency $m$, and the magnitude thereof will correspond to the magnitude of the component of frequency $n$ in the input disturbance.

The oscillator 9 is provided with the variable capacitor 29 whereby the output frequency thereof is varied and with a plurality of additional capacitors 159 and 161. One of these capacitors 159 is provided for the purpose of adjusting the frequency of the output of the oscillator for the setting of the condenser 29 which corresponds to the component of zero frequency of the input disturbance to exact equality with the resonant frequency of the mechanical filter 11. The other capacitors 161 are provided for the purpose of determining the range within which the capacitor 29 is to vary the output frequency of the oscillator 9.

The oscillator is adjusted for zero frequency input, by setting the condenser 29 to the value which corresponds to zero input frequency (as determined from a suitable calibration chart), in the absence of any input and by then varying the capacitor 159 until the reading of the meter 17 is a maximum. The range of the oscillator 9 which corresponds to the zero frequency setting of the condenser 29 is attained by connecting the second capacitor 161 from the left across the secondary 39 of the oscillator transformer 27 as in Fig. 2.

Now in the preferred practice of my invention the detector system 7 is operated as a power detector and the output of the oscillator 9 is therefore large with respect to the input energy. In consequence thereof when the oscillator 9 is adjusted in the zero position, and the output frequency of the oscillator is equal to the resonant frequency of the filter 11, the output of the system is comparatively large in spite of the suppression resulting from the balancing system described hereinbefore and unless provisions are made to decrease the output at this point, the pointer of the meter 17 is knocked off the scale and the instrument may be deleteriously affected.

For this reason, I have provided for an automatic decrease in the output of the amplifying system 15 when the variable capacitor 29 is adjusted to a point corresponding to zero frequency input. The essential elements of this feature are shown in detail in Figs. 2 and 6. The variable capacitor 29 whereby the frequency is adjusted has mounted on the shaft 163 thereof a cam 165 equipped with a button 167 that projects from its upper horizontal surface. When the knob 169 of the capacitor 29 is so turned that the capacity approaches a value corresponding to an oscillator output for zero frequency input, the button 167 engages a flat spring 171 and urges a plurality of contacts 173 into engagement with each other. When the contacts 173 are thus engaged, a portion of a resistor 175 connected across the primary 177 of the output transformer 179 of the amplifier 15 is short circuited and the output of the amplifier 15 is correspondingly decreased.

The circuit whereby the portion of the resistor 175 connected across the primary 177 is shunted out is connected through a movable contactor 181 mechanically coupled to the knob 183 whereby the range of the oscillator 9 is varied and the movable contactor 181 is disengaged from corresponding fixed contact 185 when the knob 183 is so oriented that the range of the oscillator 9 is not the one containing the resonant frequency of the filter 11. In such a case, the engagement of the contactors 173 whereby the resistor 175 is partially shunted out fails to close the shunting circuit and the decrease in the sensitivity does not occur.

As is apparent from the above given description a number of features are incorporated in the system described herein which are not essential to the operation of my invention. Among these, one of the most outstanding arises from the fact that the vibrating rod 93 is described herein as supported only at its central point. It is apparent, of course, that the rod need not necessarily be supported at its central point, and may as a matter of fact be supported at any number of other points. The method of support of the rod 93 determines the particular frequency at which it resonates.

As has been explained hereinabove, when supported at the center, the fundamental wave length at which the rod resonates is equal to twice the length of the rod. On the other hand, if the rod should be supported at two points, each point being one-fourth of the length of the rod from each terminal thereof, the fundamental of the rod would correspond to the length of the rod. So, in general, the resonant frequency of a rod having $n$ supports is given by the equation:

$$v = \frac{vn}{2l}$$

wherein $v$ is the frequency, $l$ is the length of the rod, $v$ is the velocity of propagation of a sound disturbance in the material of the rod, and $n$ is the number of supports.

It is also conceivable that two supports in a multiply supported rod might coincide with the ends of the rod. In such a case the nodes of the vibrations will, of course, be at the ends but the driving and generator means must of necessity be disposed between the ends.

Although I have shown and described certain specific embodiments of my invention, I am fully aware that many modifications thereof are possible. My invention, therefore, is not to be restricted except insofar as is necessitated by the prior art and by the spirit of the appended claims.

I claim as my invention:

1. In a vibration analyzer of the type incorporating means for translating an energy disturbance to be analyzed into an electro-magnetic disturbance, a mechanical filter for selecting components of said electro-magnetic disturbance that are proportional to individual frequencies of said energy disturbance, comprising a rod, means for coupling said rod to said translating means to vibrate said rod longitudinally and means for resiliently supporting said rod at approximately the nodal point of the longitudinal vibration thereof.

2. In a vibration analyzer of the type incorporating means for translating an energy disturbance to be analyzed into an electro-magnetic disturbance, a mechanical filter for selecting components of said electro-magnetic disturbance that are proportional to individual frequencies of said energy disturbance, comprising a rod, means for coupling said rod to said translating means to build up a longitudinal vibration in said rod and means for resiliently supporting said rod at approximately the nodal point of the vibration thereof.

3. In a vibration analyzer of the type incorporating means for translating an energy disturbance to be analyzed into an electro-magnetic disturbance, a mechanical filter for selecting components of said electro-magnetic disturbance that are proportional to individual frequencies of said energy disturbance, comprising a rod, means for coupling one end of said rod to said translating means to build up a longitudinal vibration in said rod and means for resiliently supporting said rod at approximately the nodal point of the vibration thereof.

4. In a vibration analyzer of the type incorporating means for translating an energy disturbance to be analyzed into an electro-magnetic disturbance, a mechanical filter for selecting components of said electro-magnetic disturbance that are proportional to individual frequencies of said energy disturbance, comprising a rod, means for coupling one end of said rod to said translating means to build up a longitudinal vibration in said rod and means for resiliently supporting said rod at its center at approximately the nodal point of the vibration thereof.

5. In a vibration analyzer of the type incorporating means for translating an energy disturbance to be analyzed into an electro-magnetic disturbance, a mechanical filter for selecting components of said electro-magnetic disturbance that are proportional to individual frequencies of said energy disturbance, comprising a rod, means for coupling one end of said rod to said translating means to build up a longitudinal vibration in said rod, means for resiliently supporting said rod at approximately the nodal point of the vibration thereof and means, coupled to the other end of said rod, for indicating the magnitude of the vibration thereof.

6. In a vibration analyzer of the type incorporating means for translating an energy disturbance to be analyzed into an electro-magnetic disturbance, a mechanical filter for selecting components of said electro-magnetic disturbance that are proportional to individual frequencies of said energy disturbance, comprising a rod, inductive means for coupling said rod to said translating means to vibrate said rod longitudinally and means for resiliently supporting said rod at approximately the nodal point of the longitudinal vibration thereof.

7. In a vibration analyzer of the type incorporating means for translating an energy disturbance to be analyzed into an electro-magnetic disturbance, a mechanical filter for selecting components of said electro-magnetic disturbance that are proportional to individual frequencies of said energy disturbance, comprising a rod, means for coupling said rod to said translating means to vibrate said rod longitudinally, means for resiliently supporting said rod at approximately the nodal point of the longitudinal vibration thereof and means for damping out the vibrations of the mechanical system including said rod as a mass and said resilient supporting means as a spring.

8. In a vibration analyzer of the type incorporating means for translating an energy disturbance to be analyzed into an electro-magnetic disturbance, a mechanical filter for selecting components of said electro-magnetic disturbance that are proportional to individual frequencies of said energy disturbance, comprising a rod, means for coupling said rod to said translating means to vibrate said rod longitudinally, means for resiliently supporting said rod at approximately the nodal point of the longitudinal vibration thereof and means to cooperate with said supporting means for damping out the vibrations of the mechanical system including said rod as a mass and said resilient supporting means as a spring.

9. In a vibration analyzer of the type incorporating means for translating an energy disturbance to be analyzed into an electro-magnetic disturbance, a mechanical filter for selecting components of said electro-magnetic disturbance that are proportional to individual frequencies of said energy disturbance, comprising a rod means for coupling said rod to said translating means to vibrate said rod longitudinally, means for resiliently supporting said rod at approximately the nodal point of the longitudinal vibration thereof and means for filtering out a disturbance of frequency substantially equivalent to the frequency of the mechanical system incorporating said rod as a mass and said resilient supporting means as a spring.

10. In a vibration analyzer of the type incorporating means for translating an energy disturbance to be analyzed into an electro-magnetic disturbance, a mechanical filter for selecting components of said electro-magnetic disturbance that are proportional to individual frequencies of said energy disturbance, comprising a rod, means for coupling said rod to said translating means to vibrate said rod longitudinally, means for resiliently supporting said rod at approximately the nodal point of the longitudinal vibration thereof, means for damping out the vibrations of the mechanical system including said rod as a mass and said supporting means as a spring and means for filtering out a disturbance of frequency substantially equivalent to the frequency of the mechanical system incorporating said rod as a mass and said resilient supporting means as a spring.

11. In a vibration analyzer of the type incorporating means for translating an energy disturbance to be analyzed into an electro-magnetic disturbance, a mechanical filter for selecting components of said electro-magnetic disturbance that are proportional to individual frequencies of said energy disturbance, comprising a rod, means for coupling one end of said rod to said translating means to build up a longitudinal vibration in said rod, means for resiliently supporting said rod at approximately the nodal point of the vibration thereof, filtering means for suppressing a disturbance of frequency substantially equivalent to the frequency of the mechanical system incorporating said rod as a mass and said resilient supporting means as a spring and means coupled to the other end of said rod for indicating the magnitude of the vibration thereof.

12. A vibration analyzer comprising a rod having a length $l$, means for resiliently supporting said rod at points so disposed thereon that when said rod is actuated to vibrate longitudinally it vibrates at a frequency given by the relationship $$v = \frac{vn}{2l}$$

wherein $v$ is the frequency of vibration, $v$ is the velocity of propagation of a sound disturbance in the material of the rod, and $n$ is the number of supports, means for translating an energy disturbance to be analyzed into an electro-magnetic disturbance, means for impressing another electro-magnetic disturbance of frequency $v+X$ on said first-named electro-magnetic disturbance, wherein $X$ is the frequency of a chosen component of said energy-disturbance, means for rectifying the combined product of said electro-magnetic disturbances, means for impressing said rectified product on said rod to set up a periodic disturbance of frequency $v$ in said rod and means for indicating the amplitude of the vibrations of said rod thus energized.

13. A vibration analyzer comprising a rod having a length $l$, means for resiliently supporting said rod, substantially at its center, whereby a periodic disturbance given substantially by the relationship $$v = \frac{v}{2l},$$

wherein $v$ is the frequency of the disturbance and $v$ is the velocity of propagation of a sound-like disturbance in the material of the rod, is impressed thereon said disturbance is transmitted by the resonant vibration of the rod, means for translating an energy disturbance to be analyzed into an electro-magnetic disturbance, means for impressing another electro-magnetic disturbance of frequency $v+X$ on said first-named electro-magnetic disturbance, wherein $X$ is the frequency of a chosen component of said energy-disturbance, means for rectifying the combined product of said electro-magnetic disturbances, means for impressing said rectified product on said rod to set up a periodic disturbance of frequency $v$ in said rod and means for indicating the amplitude of the vibrations of said rod thus energized.

14. As an article of manufacture, a mechanical filter comprising a rod and a resilient plate secured intermediate the ends of said rod at approximately a nodal point and in a plane transverse to the rod.

15. As an article of manufacture, a mechanical filter comprising a rod, inductors supported at ends thereof and a resilient plate secured intermediate the ends thereof at approximately a nodal point and in a plane transverse thereto.

16. In apparatus of the type incorporating means, for translating into electro-magnetic energy an external energy disturbance, means, including a variable capacitor, for impressing an additional electro-magnetic disturbance of predetermined frequency on said first-named electro-magnetic disturbance, said last-named disturbance having a magnitude large compared to said first-named disturbance, a filter for transmitting only a component of said combined disturbances having a predetermined frequency and means amplifying the output of said filter and for indicating the magnitude of the combined electro-magnetic disturbance that is transmitted; means, to cooperate with said capacitor, for reducing the amplification applied by said amplifying means to said translating energy disturbance only when the frequency of said last-named electro-magnetic disturbance is substantially equal to the frequency of the component transmitted by said filter.

WILLIAM O. OSBON.